United States Patent
Natanzon et al.

(10) Patent No.: US 10,133,874 B1
(45) Date of Patent: Nov. 20, 2018

(54) PERFORMING SNAPSHOT REPLICATION ON A STORAGE SYSTEM NOT CONFIGURED TO SUPPORT SNAPSHOT REPLICATION

(71) Applicant: EMC Corporation, Hopkinton, MA (US)

(72) Inventors: Assaf Natanzon, Tel Aviv (IL); Leehod Baruch, Rishon Leziyon (IL); Jehuda Shemer, Kfar Saba (IL); Lev Ayzenberg, Petah Tikva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 363 days.

(21) Appl. No.: 14/979,897

(22) Filed: Dec. 28, 2015

(51) Int. Cl.
*G06F 21/62* (2013.01)

(52) U.S. Cl.
CPC ................. *G06F 21/6218* (2013.01)

(58) Field of Classification Search
CPC .................................................. G06F 21/6218
See application file for complete search history.

(56) References Cited

U.S. PATENT DOCUMENTS

| | | |
|---|---|---|
| 5,170,480 A | 12/1992 | Mohan et al. |
| 5,249,053 A | 9/1993 | Jain |
| 5,388,254 A | 2/1995 | Betz et al. |
| 5,499,367 A | 3/1996 | Bamford et al. |
| 5,526,397 A | 6/1996 | Lohman |
| 5,864,837 A | 1/1999 | Maimone |
| 5,879,459 A | 3/1999 | Gadgil et al. |
| 5,990,899 A | 11/1999 | Whitten |
| 6,042,652 A | 3/2000 | Hyun et al. |
| 6,065,018 A | 5/2000 | Beier et al. |
| 6,143,659 A | 11/2000 | Leem |
| 6,148,340 A | 11/2000 | Bittinger et al. |
| 6,174,377 B1 | 1/2001 | Doering et al. |
| 6,174,809 B1 | 1/2001 | Kang et al. |
| 6,203,613 B1 | 3/2001 | Gates et al. |
| 6,260,125 B1 | 7/2001 | McDowell |
| 6,270,572 B1 | 8/2001 | Kim et al. |
| 6,272,534 B1 | 8/2001 | Guha |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

Gibson, "Five Point Plan Lies at the Heart of Compression Technology;" Tech Talk; Apr. 29, 1991; 1 Page.

(Continued)

*Primary Examiner* — Ramon A. Mercado
(74) *Attorney, Agent, or Firm* — Daly, Crowley Mofford & Durkee, LLP

(57) ABSTRACT

In one aspect, a method includes receiving, from a splitter, an I/O to be written from a virtual machine to a production virtual machine disk; sending an acknowledgement to the splitter that the I/O is received; writing data from the I/O to a first differential virtual machine disk; generating a snapshot; allocating a second differential virtual machine disk; redirecting new I/Os to the virtual machine, arriving from the splitter, to the second differential virtual machine disk and applying changes from first differential disk to a copy of data on a backup storage.

20 Claims, 7 Drawing Sheets

(56) References Cited

U.S. PATENT DOCUMENTS

| | | |
|---|---|---|
| 6,287,965 B1 | 9/2001 | Kang et al. |
| 6,467,023 B1 | 10/2002 | DeKoning et al. |
| 6,574,657 B1 | 6/2003 | Dickinson |
| 6,621,493 B1 | 9/2003 | Whitten |
| 6,804,676 B1 | 10/2004 | Bains, II |
| 6,947,981 B2 | 9/2005 | Lubbers et al. |
| 7,043,610 B2 | 5/2006 | Horn et al. |
| 7,051,126 B1 | 5/2006 | Franklin |
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,353,335 B2 | 4/2008 | Kawamura |
| 7,360,113 B2 | 4/2008 | Anderson et al. |
| 7,426,618 B2 | 9/2008 | Vu et al. |
| 7,519,625 B2 | 4/2009 | Honami et al. |
| 7,519,628 B1 | 4/2009 | Leverett |
| 7,546,485 B2 | 6/2009 | Cochran et al. |
| 7,590,887 B2 | 9/2009 | Kano |
| 7,606,940 B2 | 10/2009 | Yamagami |
| 7,719,443 B1 | 5/2010 | Natanzon |
| 7,757,057 B2 | 7/2010 | Sangapu et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,205,009 B2 | 6/2012 | Heller et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,738,870 B1 * | 5/2014 | Balasubramanian ... G06F 11/14 711/161 |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,407 B1 * | 11/2014 | Balasubramanian ........................ G06F 11/1451 711/161 |
| 8,898,409 B1 * | 11/2014 | Natanzon ................ G06F 11/00 711/162 |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |

(56) References Cited

U.S. PATENT DOCUMENTS

| | | |
|---|---|---|
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,255 B1 | 4/2017 | Natanzon |
| 9,619,256 B1 | 4/2017 | Natanzon et al. |
| 9,619,264 B1 | 4/2017 | Natanzon et al. |
| 9,619,543 B1 | 4/2017 | Natanzon et al. |
| 9,632,881 B1 | 4/2017 | Natanzon |
| 9,639,295 B1 | 5/2017 | Natanzon et al. |
| 9,639,383 B1 | 5/2017 | Natanzon |
| 9,639,592 B1 | 5/2017 | Natanzon et al. |
| 9,652,333 B1 | 5/2017 | Bournival et al. |
| 9,658,929 B1 | 5/2017 | Natanzon et al. |
| 9,659,074 B1 | 5/2017 | Natanzon et al. |
| 9,665,305 B1 | 5/2017 | Natanzon et al. |
| 9,668,704 B2 | 6/2017 | Fuimaono et al. |
| 9,672,117 B1 | 6/2017 | Natanzon et al. |
| 9,678,680 B1 | 6/2017 | Natanzon et al. |
| 9,678,728 B1 | 6/2017 | Shemer et al. |
| 9,684,576 B1 | 6/2017 | Natanzon et al. |
| 9,690,504 B1 | 6/2017 | Natanzon et al. |
| 9,696,939 B1 | 7/2017 | Frank et al. |
| 9,699,252 B2 * | 7/2017 | Antony .............. H04L 67/1095 |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 2002/0129168 A1 | 9/2002 | Kanai et al. |
| 2003/0048842 A1 | 3/2003 | Fourquin et al. |
| 2003/0061537 A1 | 3/2003 | Cha et al. |
| 2003/0110278 A1 | 6/2003 | Anderson |
| 2003/0145317 A1 | 7/2003 | Chamberlain |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0069865 A1 * | 3/2006 | Kawamura .......... G06F 11/2064 |
| | | 711/114 |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0179343 A1 | 8/2006 | Kitamura |
| 2006/0195670 A1 | 8/2006 | Iwamura et al. |
| 2007/0055833 A1 | 3/2007 | Vu et al. |
| 2007/0113004 A1 * | 5/2007 | Sugimoto ............. G06F 3/0608 |
| | | 711/112 |
| 2007/0156984 A1 * | 7/2007 | Ebata .................... G06F 3/0608 |
| | | 711/162 |
| 2007/0180208 A1 | 8/2007 | Yamasaki |
| 2007/0180304 A1 | 8/2007 | Kano |
| 2007/0198602 A1 | 8/2007 | Ngo et al. |
| 2007/0198791 A1 | 8/2007 | Iwamura et al. |
| 2010/0058011 A1 | 3/2010 | Satoyama et al. |
| 2010/0250880 A1 | 9/2010 | Mimatsu |
| 2010/0299368 A1 * | 11/2010 | Hutchins ................. G06F 9/455 |
| | | 707/803 |
| 2014/0095823 A1 * | 4/2014 | Shaikh .................... G06F 12/02 |
| | | 711/165 |
| 2015/0373102 A1 * | 12/2015 | Antony ............... H04L 67/1095 |
| | | 709/219 |
| 2015/0378636 A1 * | 12/2015 | Yadav .................. G06F 3/0608 |
| | | 711/165 |
| 2016/0378527 A1 * | 12/2016 | Zamir ................. G06F 9/45558 |
| | | 711/162 |
| 2016/0378528 A1 * | 12/2016 | Zamir ................. G06F 9/45558 |
| | | 711/162 |

OTHER PUBLICATIONS

Soules et al., "Metadata Efficiency in Versioning File Systems;" $2^{nd}$ USENIX Conference on File and Storage Technologies; Mar. 31, 2003-Apr. 2, 2003; 16 Pages.

(56) References Cited

OTHER PUBLICATIONS

AIX System Management Concepts: Operating Systems and Devices; Bull Electronics Angers; May 2000; 280 Pages.
Soules et al., "Metadata Efficiency in a Comprehensive Versioning File System;" May 2002; CMU-CS-02-145; School of Computer Science, Carnegie Mellon University; 33 Pages.
"Linux Filesystems," Sams Publishing; 2002; Chapter 1: Introduction to Filesystems pp. 17-22 and Chapter 3: Overview of Journaling Filesystems pp. 67-71; 12 Pages.
Bunyan et al., "Multiplexing in a BrightStor® ARCserve® Backup Release 11;" Mar. 2004; 4 Pages.
Marks, "Network Computing, 33;" Cover Story; Feb. 2, 2006; 8 Pages.
Hill, "Network Computing, NA;" Cover Story; Jun. 8, 2006; 9 Pages.
Microsoft Computer Dictionary, Fifth Edition; 2002; 3 Pages.
Wikipedia; Retrieved on Mar. 29, 2011 from http://en.wikipedia.org/wiki/DEFLATE: Deflate; 6 Pages.
Wikipedia; Retrieved on Mar. 29, 2011 from http://en.wikipedia.org/wiki/Huffman_coding: Huffman Coding; 11 Pages.
Wikipedia; Retrieved on Mar. 29, 2011 from http:///en.wikipedia.org/wiki/LZ77: LZ77 and LZ78; 2 Pages.
U.S. Appl. No. 11/609,560.
U.S. Appl. No. 12/057,652.
U.S. Appl. No. 11/609,561.
U.S. Appl. No. 11/356,920.
U.S. Appl. No. 10/512,687.
U.S. Appl. No. 11/536,233.
U.S. Appl. No. 11/536,215.
U.S. Appl. No. 11/536,160.
U.S. Appl. No. 11/964,168.
U.S. Non-Final Office Action dated Mar. 8, 2018 for U.S. Appl. No. 15/275,769; 14 pages.
Response to U.S. Non-Final Office Action dated Mar. 8, 2018 for U.S. Appl. No. 15/275,769; Response filed Jun. 8, 2018; 16 Pages.
Final Office Action dated Sep. 6, 2018 for U.S. Appl. No. 15/275,769; 14 pages.

* cited by examiner

PERFORMING SNAPSHOT REPLICATION ON A STORAGE SYSTEM NOT CONFIGURED TO SUPPORT SNAPSHOT REPLICATION

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by generating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes receiving, from a splitter, an I/O to be written from a virtual machine to a production virtual machine disk; sending an acknowledgement to the splitter that the I/O is received; writing data from the I/O to a first differential virtual machine disk; generating a snapshot; allocating a second differential virtual machine disk; redirecting new I/Os to the virtual machine, arriving from the splitter, to the second differential virtual machine disk and applying changes from first differential disk to a copy of data on a backup storage.

In another aspect, an apparatus includes electronic hardware circuitry configured to receive, from a splitter, an I/O to be written from a virtual machine to a production virtual machine disk; send an acknowledgement to the splitter that the I/O is received; write data from the I/O to a first differential virtual machine disk; generate a snapshot; allocate a second differential virtual machine disk; redirect new I/Os to the virtual machine, arriving from the splitter, to the second differential virtual machine disk; and apply changes from first differential disk to a copy of data on a backup storage.

In a further aspect, an article includes a non-transitory computer-readable medium that stores computer-executable instructions. The instructions cause a machine to receive, from a splitter, an I/O to be written from a virtual machine to a production virtual machine disk, send an acknowledgement to the splitter that the I/O is received, write data from the I/O to a first differential virtual machine disk, generate a snapshot, allocate a second differential virtual machine disk, redirect new I/Os to the virtual machine, arriving from the splitter, to the second differential virtual machine disk and apply changes from first differential disk to a copy of data on a backup storage.

DETAILED DESCRIPTION

Figure 1:
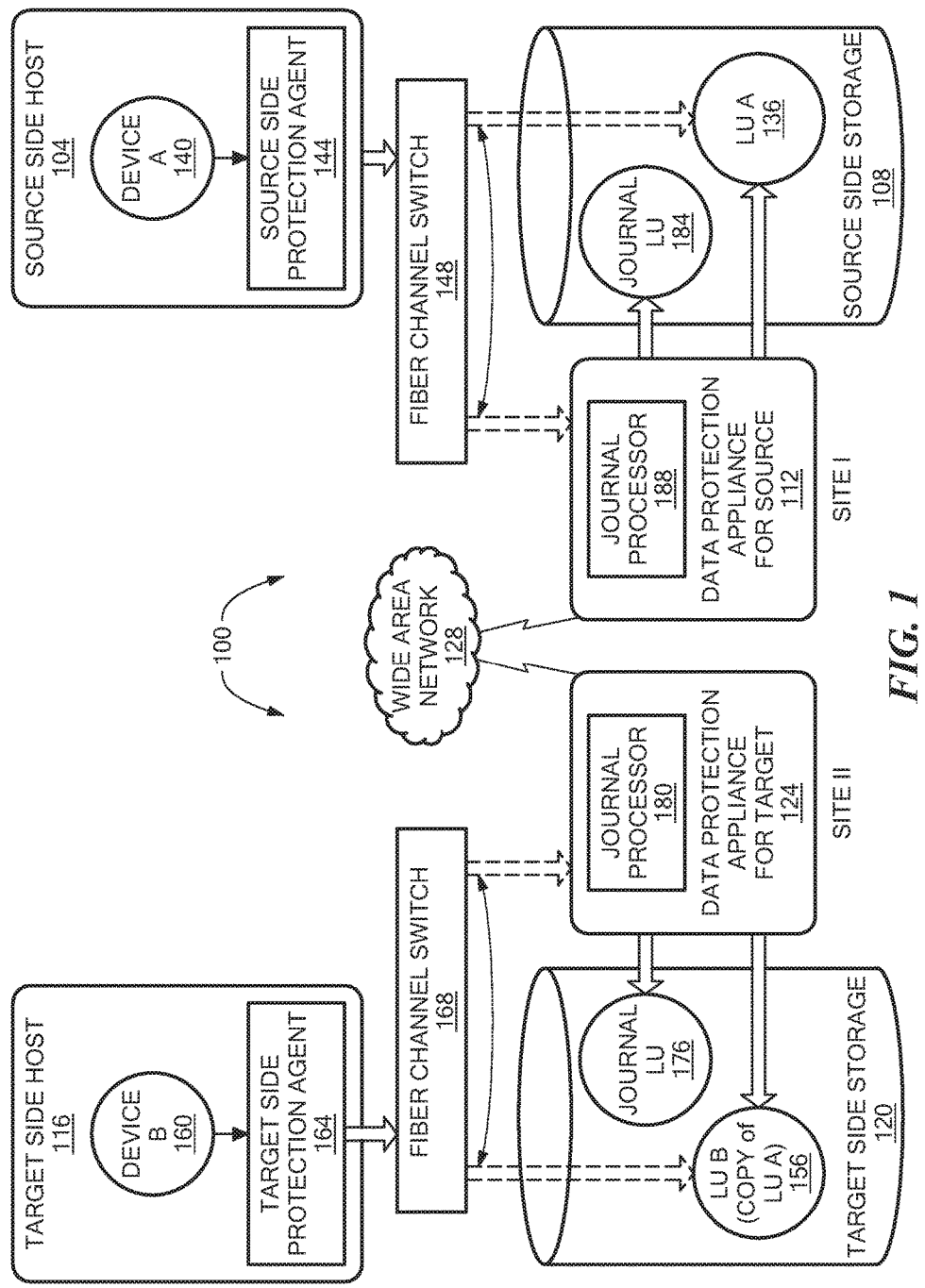
FIG. 1 is a block diagram of an example of a data protection system.

There is not a way to perform snapshot-based replication on arrays that do not support snapshots. In certain embodiments, techniques described here may enable snapshot-based replication with little impact on production performance. In some embodiments, techniques described herein may be used on any production array that does not support snapshots or when native snapshots degrades production performance. For example, certain techniques described herein may be used to perform snapshot-based replication of virtual machines in order to backup them to a deduplicated storage system. In some examples, certain techniques allow saving the snapshot differentials in a different and sometimes dedicated storage, and thus have almost no effect on the production environment.

In many embodiments, a deduplicated secondary storage array may not handle random I/O workload and overlapping I/Os well, and snapshot shipping may be the a technique which will allow sending large bulks of data to protection storage.

The following definitions may be useful in understanding the specification and claims.

The following may be helpful in understanding the specification and claims:

BACKUP SITE—may be a facility where replicated production site data is stored; the backup site may be located in a remote site or at the same location as the production site; a backup site may be a virtual or physical site; a backup site may be referred to alternatively as a replica site or a replication site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

I/O REQUEST—an input/output request (sometimes referred to as an I/O or IO), which may be a read I/O request (sometimes referred to as a read request or a read) or a write I/O request (sometimes referred to as a write request or a write).

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more virtual disks or virtual LUNs, which may correspond to one or more Virtual Machines. As used herein, LUN and LU may be used interchangeably to refer to a LU.

MANAGEMENT AND DEPLOYMENT TOOLS—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system; may be a virtual or physical site.

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines. May be referred to herein as an Open Replicator Splitter (ORS).

VIRTUAL VOLUME: may be a volume which is exposed to host by a virtualization layer, the virtual volume may be spanned across more than one site and or volumes VASA: may be a set of vCenter providers that allow an administrator to manage storage VMFS: may be a virtual machine file system, a file system provided by VMware for storing a virtual machine VMDK: may be a virtual machine disk file containing a disk data in a VMFS. Analog to a LUN in a block storage array Virtual RPA (vRPA)/Virtual DPA (vDPA): may be a DPA running in a VM.

VASA may be vSphere Storage application program interfaces (APIs) for Storage Awareness.

MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

Referring to FIG. 1, a data protection system 100 includes two sites; Site I, which is a production site, and Site II, which is a backup site or replica site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. In one embodiment, in a virtual environment a hypervisor, in one example, consumes logical units, generates a distributed file system on them (such as, for example, VMFS generating files in the file system), and exposes the files as logical units to the virtual machines (each VMDK is seen as a SCSI device by virtual hosts). In another example, the hypervisor consumes a network based file system and exposes files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (sometimes referred to as a splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one example, LU B is configured so that its size is identical to the size of LU A. Thus, for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer generates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

Figure 2:
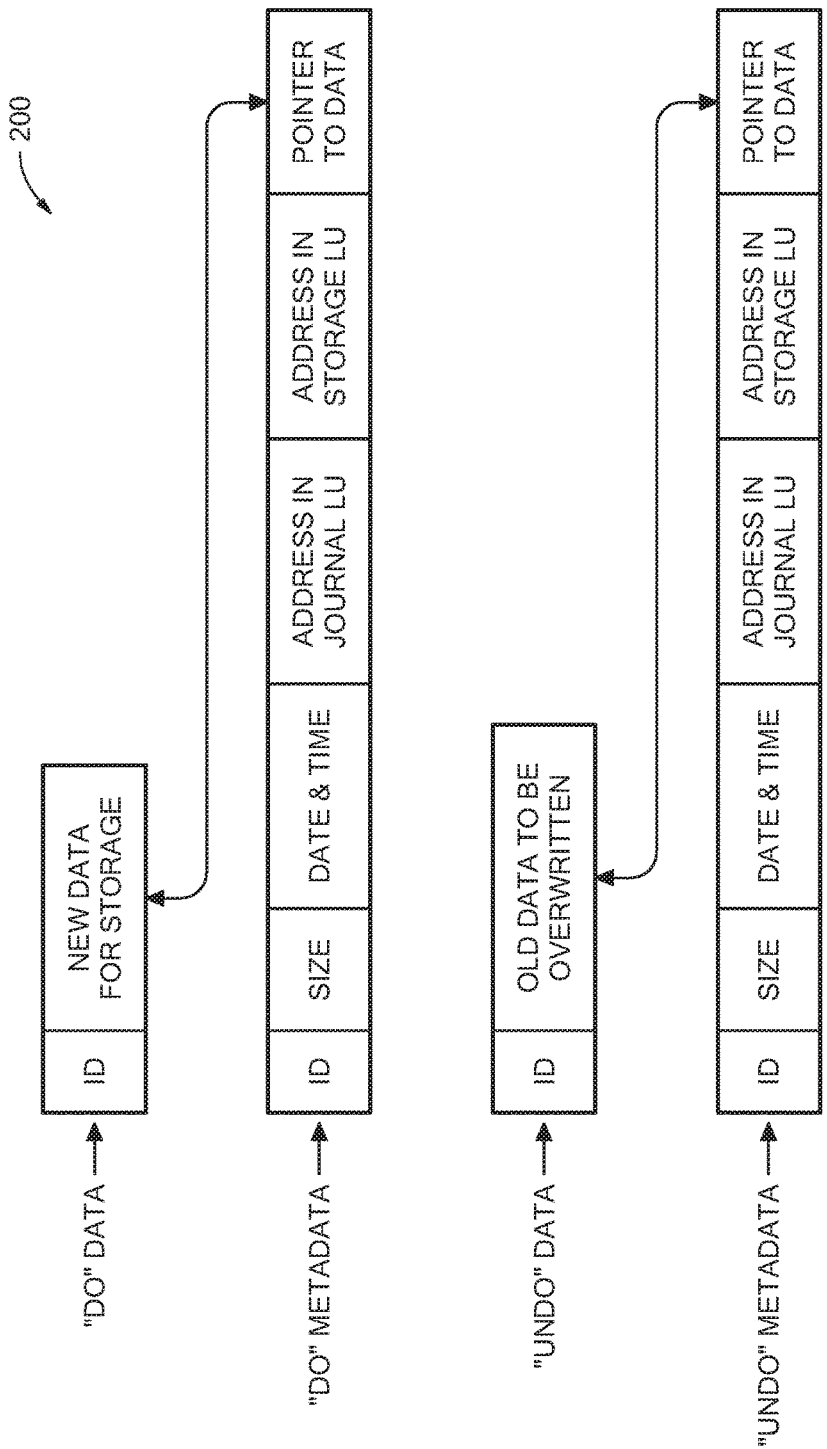
FIG. 2 is an illustration of an example of a journal history of write transactions for a storage system.

Referring to FIG. 2, which is an illustration of a write transaction 200 for a journal. The journal may be used to provide an adaptor for access to storage 120 at the state it was in at any specified point in time. Since the journal includes the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3A:
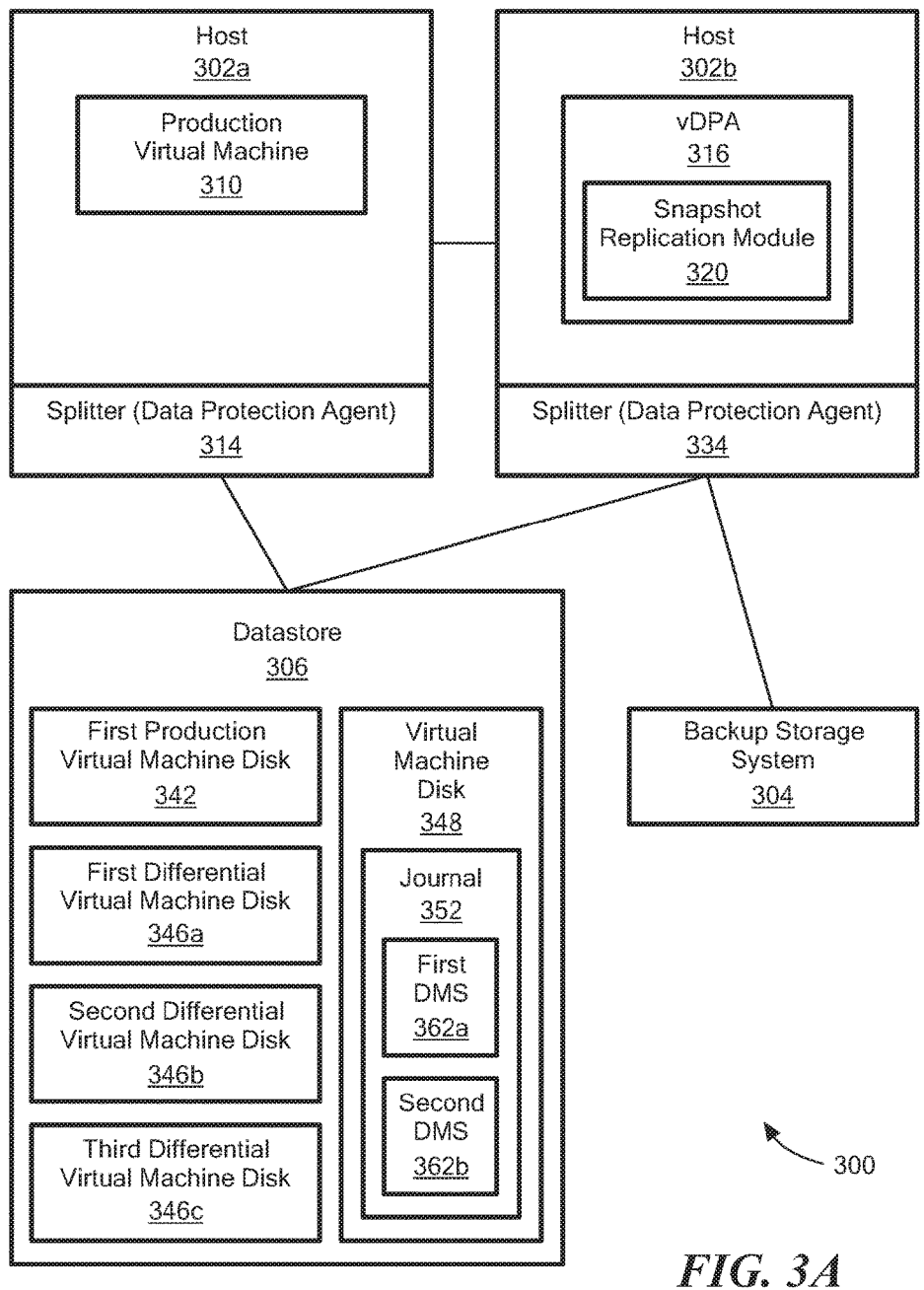
FIG. 3A is a block diagram of an example of a data protection system to perform snapshot replication on a storage system not configured to support snapshot replication, according to an embodiment of the disclosure.

Referring to FIG. 3, a data protection system includes a host 302a, a host 302b, a backup storage system (e.g., a deduplicated storage system) and a data store 306, according to an embodiment of the disclosure. The host includes a production virtual machine 310 and a splitter 314 (e.g., a data protection agent similar to the data protection agent 144). In one example, the host 302b is a hypervisor and the splitter 314 runs either in the hypervisor kernel or in another layer in the hypervisor such as VMWare VAIO which allows the splitter to intercept I/Os arriving at virtual machine disks (VMDKs). The host 302b includes a virtual data protection appliance (e.g., similar in functionality to the DPA appliance 124) having a snapshot replication module 320, and a splitter 334 (e.g., a data protection agent similar to the data protection agent 164. In one example, the splitter 334 is located on the host 302b to enable protection of virtual machines on the host 302b. In another example, the splitter 334 at the host 302b allows faster access to virtual machine disks from the vDPA 316 and allows also replication of other virtual machines which may run on the host 302b. In one example, one or more of the hosts 302a, 302b are VMWARE® ESXI® servers.

The datastore 306 includes virtual machine disk (e.g., a first production virtual machine disk 342), differential virtual machine disks (e.g., a first differential virtual machine disk 346a and a second differential virtual machine disk 346b) and a virtual machine disk 348. The differential virtual machine disks 346a-346c are called differential virtual machine disks because each are used to store differential snapshot data (i.e., the differential virtual machine disks 346a-346c may hold copies of the changes that happened to production virtual machine disk 342) In one example, the first differential virtual machine disk 346a may include the writes that occurred to the first production virtual machine 342 from time t1 to time t2, the second differential virtual machine disk 346b may include the changes that occurred to the production virtual machine disk 342 from time t2 to time t3, and the third differential virtual machine disk 346c may include changes that occurred to the production virtual machine disk 342 from time t2 to time t3. A journal 352 is stored on the virtual machine disk 348. In one example, the differential virtual machine disks 346a-346c are thin provisioned.

In some examples, differential virtual machine disks 346a-346c, the virtual machine disk 348 may be stored in a different datastore than production virtual machines disk 342, so that writes and reads arriving to the differential virtual machine disks 346a-346c will have no effect on production performance (e.g., performance in writing and reading from the virtual machine 310 to the first production virtual machine disk 342). As used herein, a datastore is a file system installed on a logical unit on a NAS that includes virtual machine disks.

The journal 352 includes delta marker streams (DMS) (e.g., a first DMS 362a and a second DMS 362b). A DMS includes the metadata (i.e., the list locations that may be different between the one differential virtual machine disk and another differential virtual machine disk).

In one example, the first DMS includes the metadata differences between the current copy of the production VMDKs 342 and the copy currently in the backup storage 304. The journal 352, is not like the journals 176, 184 described in FIGS. 1 and 2. That is, the journal 352 does not include the data changes; but rather, the metadata of the changes. The data of the changes are stored in the differential virtual machine disks.

Figure 3B:
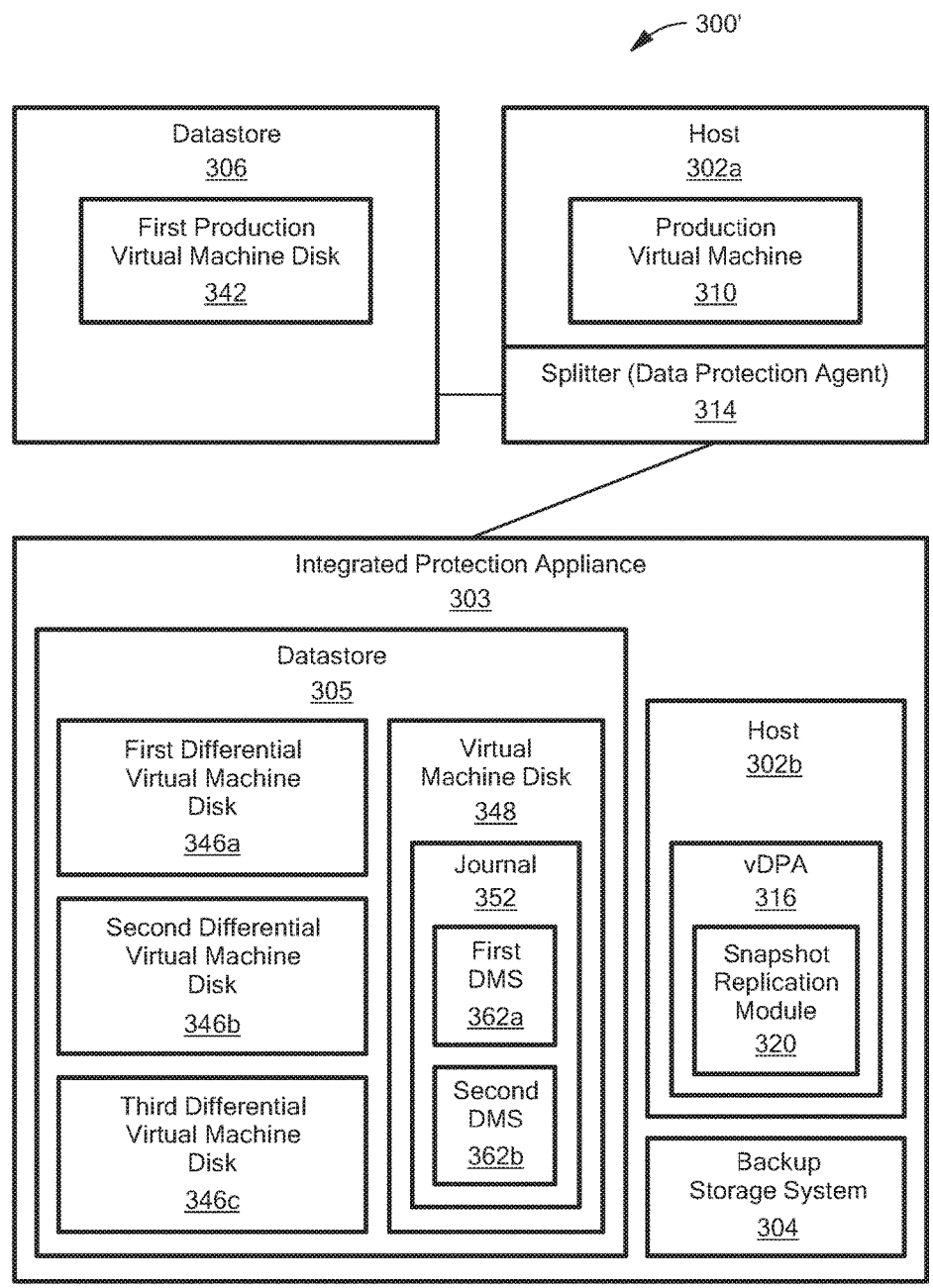
FIG. 3B is a block diagram of another example of a data protection system to perform snapshot replication on a storage system not configured to support snapshot replication, according to an embodiment of the disclosure.

Referring to FIG. 3B, a system 300' is another example of a data protection system to perform snapshot replication on a storage system not configured to support snapshot replication, according to an embodiment of the disclosure. The system 300' includes a host 302a, an integrated protection appliance 303 and a datastore 306 including the first production virtual machine disk 342. The integrated protection appliance 303 includes the host 302b, the backup storage 304 and a datastore 303. The datastore 303 includes the first, second and third differential virtual machine disks 346a-346c and the virtual machine disk 348, which includes the journal 352. In some examples, the system 300' allows backup and protection of data into the backup storage without any disruption to the production work (e.g., writing to the first production virtual machine disk 342 by the host 302a.

Figure 4:
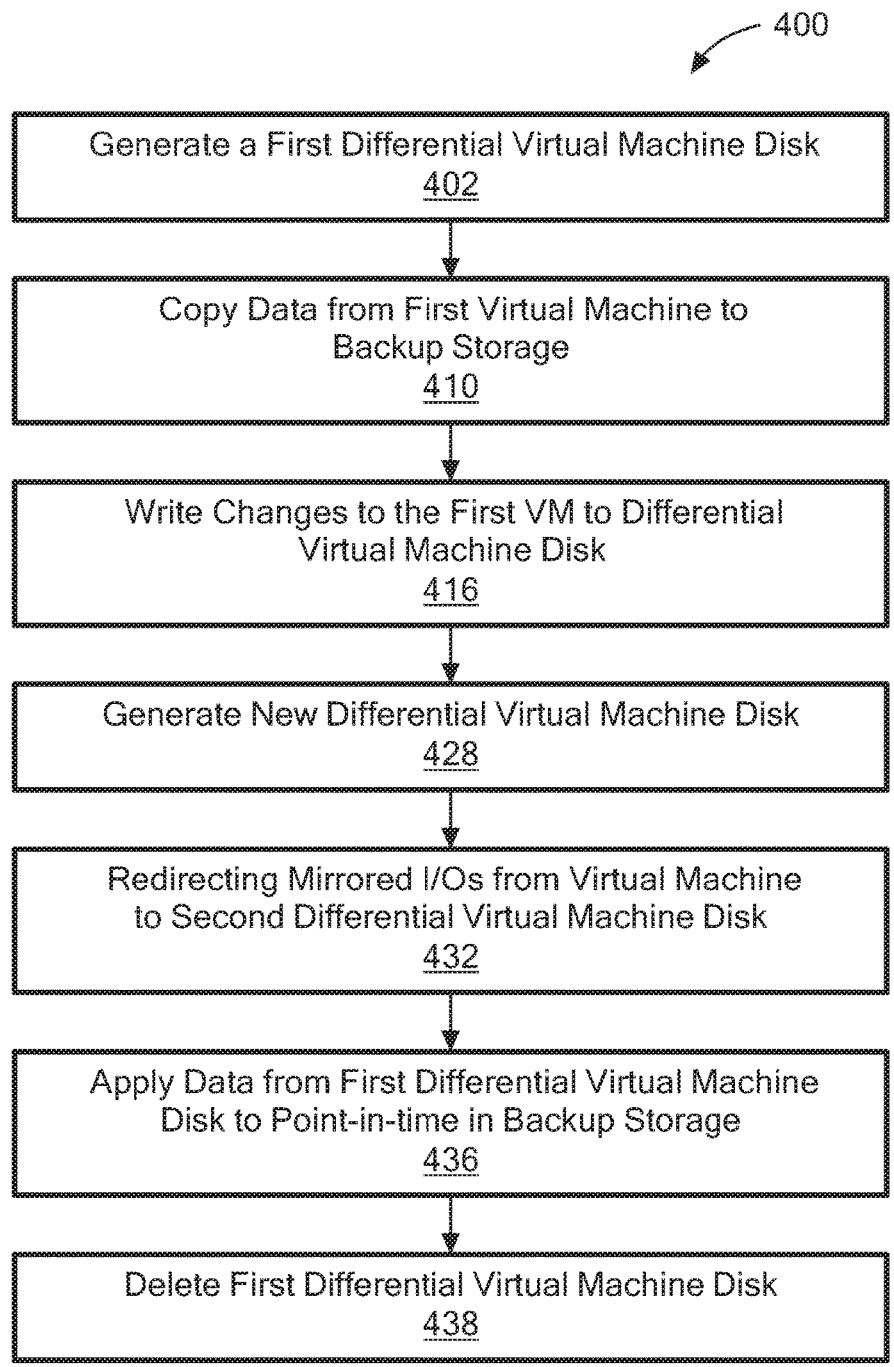
FIG. 4 is a flowchart of an example of a process to generate an initial snapshot into the backup storage, according to an embodiment of the disclosure.

Referring to FIG. 4, a process 400 is an example of a process to generate an initial snapshot into the backup storage, according to an embodiment of the disclosure Process 400 generates a virtual machine disk (402). For example, the vDPA 316 generates a first virtual machine disk 346a that will include changes and a delta marker stream (DMS) on journal 352. In one example, the first virtual machine disk 346a is thin provisioned.

Process 400 copies data from a first virtual machine to a backup storage (410). For example, the vDPA 316 copies data of the first VM 310 (i.e. reading data from production virtual machine disk 342) into the backup storage 304. In one example, the copying happens while the data is changing so that the copy in the backup storage 304 is not consistent.

Process 400 writes changes to the first virtual machine to the first differential virtual machine disk (416). For example, vDPA 316 writes changes to the first virtual machine 310 to the first differential virtual machine disk 346a. For example, the splitter 314 intercepts the write I/O commands which arrive to the production virtual machine disk 342, and sends them to vDPA 316. The vDPA 316 marks the metadata of changed location in the DMS 362a (e.g., the offset and the volume of the writes), and acknowledges the I/Os. The splitter 314 write the I/O to the first production virtual machine disk 342 and asynchronously vDPA 316 write the data arriving from the splitter 314 to the differential virtual machine disk 346a.

Once a non-consistent copy for first virtual machine disk 342 is generated on the backup storage 304, process 400 generates a new differential virtual machine disk (428). For example, vDPA 316 generates a second differential virtual machine disk 346b. In one example, the second differential virtual machine disk 346b is thin provisioned.

Process 400 redirects mirrored I/Os from virtual machine to the second thin differential virtual machine disk (432). For example, the splitter 334 sends the IO to vDPA 316a, and once vDPA acknowledge the IO the splitter send the I/O to VMDK 342, vDPA 316 then asynchronously write the IO to the second differential virtual machine disk 346b, and track the metadata of the IO in the second DMS.

Process 400 applies data from the first differential virtual machine disk to point-in-time in backup storage (436). For example, vDPA 316 applies data from the first differential virtual machine disk 346a to a point-in-time in backup storage 304 (e.g., vDPA 316 reads the list of changed locations from the first DMS 362a and, for each changed location, vDPA 316 reads the changes from first differential virtual disk 346a and write the changes to backup storage system 304).

Process 400 deletes first differential virtual machine disk (438). For example, after processing block 436 the backup storage 304 has a consistent point, and vDPA 316 deletes the first differential virtual machine disk.

Figure 5:
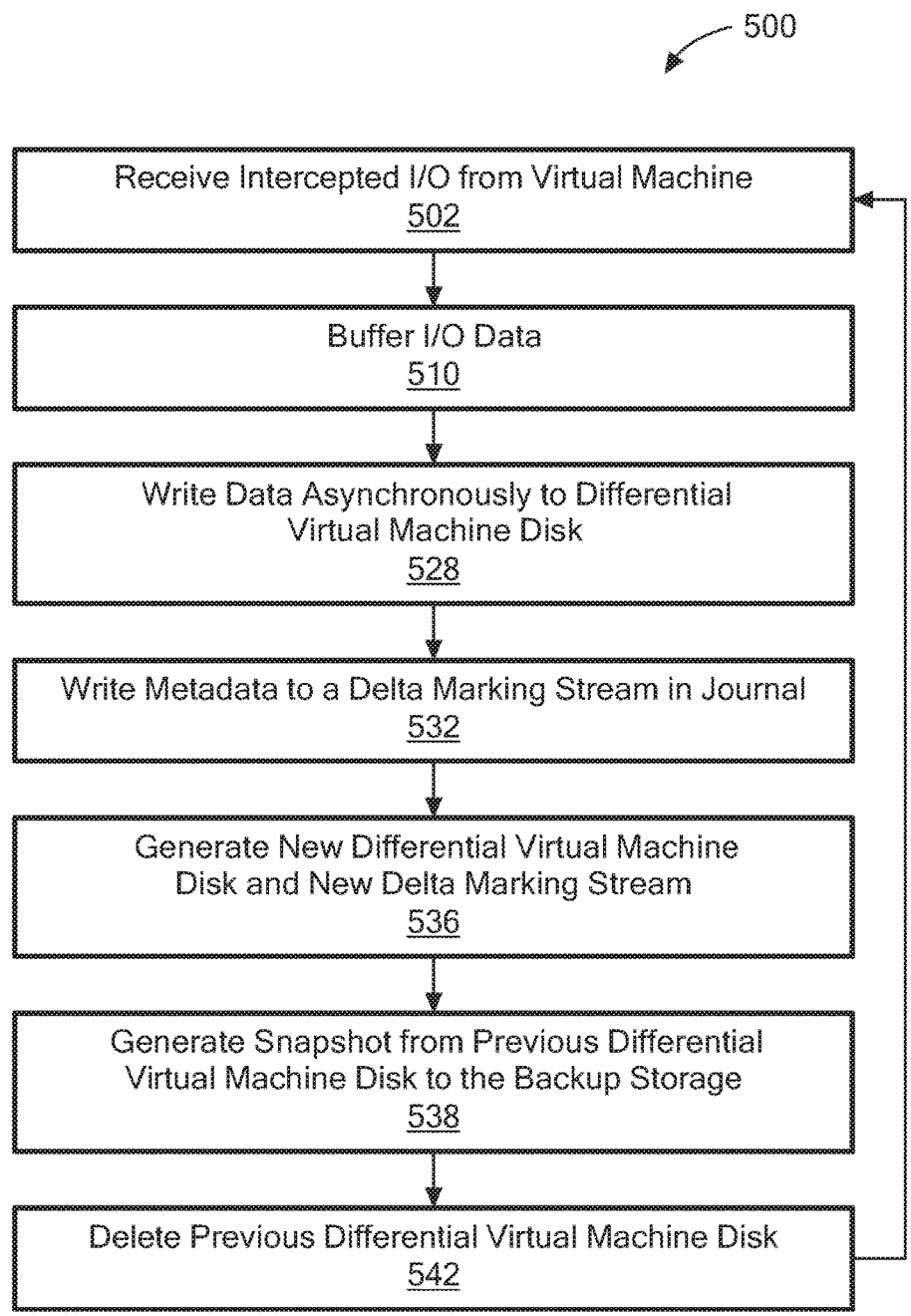
FIG. 5 is a flowchart of an example of a process to perform snapshot replication on a storage system not configured to support snapshot replication, according to an embodiment of the disclosure.

Referring to FIG. 5, a process 500 is an example of a process to perform snapshot replication on a storage system not configured to support snapshot replication, according to an embodiment of the disclosure. In one example, the process 500 is performed by the snapshot replication module 320. It will be appreciated by one of ordinary skill in the art that the second differential machine disk 346b and the second DMS 362b in FIG. 3 have not been generated prior to execution of process 500.

Process 500 receives intercepted I/O from virtual machine (502). For example, the I/O is intercepted by the splitter 314 and sent to (e.g., through an iSCSI or through like TCP/IP any other protocol) and received by the vDPA 316.

Process 500 buffers the I/O data (510) and sends an acknowledgment (516). For example, the vDPA 316 buffers the I/O data in memory of vDPA 316 and sends an acknowledgement that it received the I/O to the splitter 314, which in turn writes the I/O to the first production virtual machine disk 342a.

Process 500 write I/O data asynchronously to the differential virtual machine disk (528) and metadata to a delta marking stream in journal (532). For example, the vDPA 316 writes the I/O data asynchronously to the differential virtual machine disk 346b and writes the I/O metadata to the first DMS 362a.

When the system 300 generates a snapshot for a point-in-time to be stored in the protection storage, process 500 generates a new differential virtual machine disk and a new delta marking stream (536). For example, the system or the user requests generating a point-in-time snapshot of the production VM 310 (e.g., generating a point-in-time copy of the virtual disks of VM 310, (i.e., production virtual machine disk 342)) in order to push the point-in-time copy of the data to the backup storage 304, vDPA 316 generates the differential machine disk 346c and the second DMS 362b to track further changes.

Process 500 generates a snapshot of the copy in the backup storage (538). For example, the vDPA 316 generates a snapshot of the copy in the in the backup storage 304 and applies the differences from the differential disk 346b to a copy of the data in the backup storage 304, so that the backup storage 304 holds both copy of the old point-in-time and the new point-in-time.

Process 500 deletes previous differential virtual machine disk (542). For example, the vDPA 316 deletes the differential virtual machine disk 346b.

After processing block 542 the process 500 repeats.

In one example, the backup storage system 304 may be remote or local. In one example, the differential virtual machine disks 346a-346c may be configured on a different datastores than the production virtual machine disk 342 which will have minimum impact on production performance (e.g., writing I/Os from the VM 310 to the production virtual machine disk 342). In some examples, the marking on the differential virtual machine disk and replicating snapshots may be performed on different vDPAs to boost performance.

Figure 6:
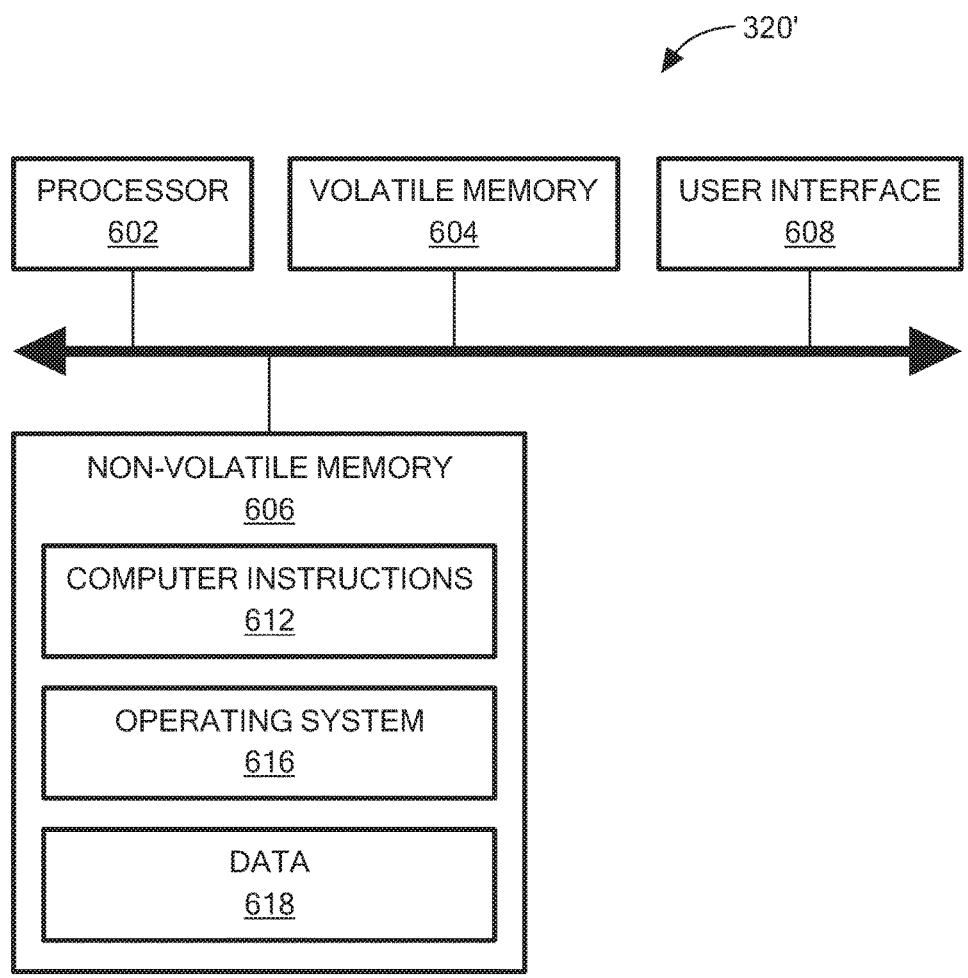
FIG. 6 is a simplified block diagram of an example of a computer on which any portion of the process of FIGS. 4 and 5 may be implemented, according to an embodiment of the disclosure.

Referring to FIG. 6, in one example, the snapshot replication module 320 is a snapshot replication module 320', according to an embodiment of the disclosure. In one example, the snapshot replication module 320' includes a processor 602, a volatile memory 604, a non-volatile memory 606 (e.g., hard disk) and the user interface (UI) 608

(e.g., a graphical user interface, a mouse, a keyboard, a display, touch screen and so forth). The non-volatile memory 606 stores computer instructions 612, an operating system 616 and data 618. In one example, the computer instructions 612 are executed by the processor 602 out of volatile memory 604 to perform all or part of the processes described herein (e.g., processes 400 and 500).

The processes described herein (e.g., process 400) is not limited to use with the hardware and software of FIG. 6; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 400 and 500 are not limited to the specific processing order of FIGS. 4 and 5, respectively. Rather, any of the processing blocks of FIGS. 4 and 5 may be re-ordered, combined or removed, performed in parallel or in serial, as necessary, to achieve the results set forth above.

The processing blocks (for example, in the processes 400 and 500) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
   receiving at a virtual data protection appliance (vDPA) of a host system, from a splitter at a production host system, an I/O to be written from a virtual machine to a production virtual machine disk residing in a datastore;
   sending, via the vDPA, an acknowledgement to the splitter that the I/O is received;
   writing data from the I/O to a first differential virtual machine disk at the datastore;
   upon generation of a snapshot of the production virtual machine disk:
   allocating, via the vDPA, a second differential virtual machine disk at the datastore;
   redirecting, via the vDPA, new I/Os from the virtual machine, arriving at the splitter, to the second differential virtual machine disk; and
   applying, via the vDPA, changes from first differential virtual machine disk to a copy of data on a backup storage;
   wherein the vDPA generates the first and second differential machine disks.

2. The method of claim 1, further comprising deleting, via the vDPA, the first differential virtual machine disk after applying the changes from first differential virtual machine disk to the copy of data on the backup storage.

3. The method of claim 1, further comprising buffering, via the vDPA, the I/O data after receiving the I/O data from the splitter.

4. The method of claim 3, wherein writing I/O data to the first differential virtual machine disk comprises writing asynchronously I/O data to the first differential virtual machine disk.

5. The method of claim 4, further comprising:
   writing metadata to a first delta marker stream; and
   after generating the snapshot, generating a second delta marker stream.

6. The method of claim 1, further comprising:
   generating a third differential virtual machine disk;
   copying data from the virtual machine to the backup storage;
   writing changes in the virtual machine to the third differential virtual machine disk;
   generating a new differential virtual machine disk;
   redirecting mirrored I/Os from the virtual machine to the third differential virtual machine disk;
   applying data from the third differential virtual machine disk to a point-in-time in backup storage; and
   deleting the third differential virtual machine disk.

7. The method of claim 1, wherein generating the snapshot comprises generating a snapshot on the backup storage before replicating the differences.

8. The method of claim 1, wherein differential virtual machine disks are generated automatically on separate datastores.

9. The method of claim 1, wherein applying changes from first differential disk to a copy of data on a backup storage comprises:
   reading a list of changes from a delta marker stream;
   for each change, reading data from production virtual machine disk; and
   writing the data read to the backup storage.

10. An apparatus, comprising:
    a virtual data protection appliance (vDPA) of a host system; and
    a snapshot replication module, executable by the vDPA via the host system, the module configured to:
       receive, at the vDPA from a splitter of a production host system, an I/O to be written from a virtual machine to a production virtual machine disk residing in a datastore;
       send, via the vDPA, an acknowledgement to the splitter that the I/O is received;
       write data from the I/O to a first differential virtual machine disk at a datastore;
       upon generation of a snapshot of the production virtual machine disk:
          allocate, via the vDPA, a second differential virtual machine disk at the datastore;
          redirect new I/Os from the virtual machine, arriving at the splitter, to the second differential virtual machine disk; and
          apply, via the vDPA, changes from first differential virtual machine disk to a copy of data on a backup storage;
       wherein the vDPA generates the first and second differential machine disks.

11. The apparatus of claim 10, wherein the snapshot replication module is further configured to:
    delete, via the vDPA, the first differential virtual machine disk after applying the changes from first differential virtual machine disk to the copy of data on the backup storage;
    buffer the I/O data after receiving the I/O data from the splitter;
    write metadata to a first delta marker stream; and
    generating a second delta marker stream after generating the snapshot,
    wherein writing I/O data to the first differential virtual machine disk comprises writing asynchronously I/O data to the first differential virtual machine disk.

12. The apparatus of claim 10, wherein the snapshot replication module is further configured to:
    generate a third differential virtual machine disk;
    copy data from the virtual machine to the backup storage;
    write changes in the virtual machine to the third differential virtual machine disk;
    generate a new differential virtual machine disk;
    redirect mirrored I/Os from the virtual machine to the third differential virtual machine disk;
    apply data from the third differential virtual machine disk to a point-in-time in backup storage; and
    delete the third differential virtual machine disk.

13. The apparatus of claim 10, wherein generating the snapshot comprises generating a snapshot on the backup storage before replication the differences.

14. The apparatus of claim 10, wherein differential virtual machine disks are generated automatically on separate datastores.

15. The apparatus of claim 10, wherein applying changes from first differential disk to a copy of data on a backup storage comprises:
    reading a list of changes from a delta marker stream;
    for each change, reading data from production virtual machine disk; and
    writing the data read to the backup storage.

16. An article comprising:
    a non-transitory computer-readable medium that stores computer-executable instructions, the instructions causing a machine to:
       receive, at a virtual data protection appliance (vDPA), from a splitter at a production host system, an I/O to be written from a virtual machine to a production virtual machine disk residing in a datastore;
       send, via the vDPA, an acknowledgement to the splitter that the I/O is received;
       write data from the I/O to a first differential virtual machine disk at the datastore;
       upon generation of a snapshot of the production virtual machine disk:
          allocate, via the vDPA, a second differential virtual machine disk at the datastore;
          redirect, via the vDPA, new I/Os from the virtual machine, arriving at the splitter, to the second differential virtual machine disk; and
          apply, via the vDPA, changes from first differential virtual machine disk to a copy of data on a backup storage;
       wherein the vDPA generates the first and second differential machine disks.

17. The article of claim 16, further comprising instructions causing the machine to:
    delete, via the vDPA, the first differential virtual machine disk after applying the changes from first differential virtual machine disk to the copy of data on the backup storage;
    buffer the I/O data after receiving the I/O data from the splitter;
    write metadata to a first delta marker stream; and
    generating a second delta marker stream after generating the snapshot,
    wherein instructions causing the machine to write I/O data to the first differential virtual machine disk comprises instructions causing the machine to write asynchronously I/O data to the first differential virtual machine disk.

18. The article of claim 16, further comprising instructions causing the machine to:
    generate a third differential virtual machine disk;
    copy data from the virtual machine to the backup storage;
    write changes in the virtual machine to the third differential virtual machine disk;
    generate a new differential virtual machine disk;
    redirect mirrored I/Os from the virtual machine to the third differential virtual machine disk;
    apply data from the third differential virtual machine disk to a point-in-time in backup storage; and
    delete the third differential virtual machine disk.

19. The article of claim 16, wherein the instructions causing the machine to generate the snapshot comprises instructions causing the machine to generate a snapshot on the backup storage before replicating the differences.

20. The article of claim 16, wherein differential virtual machine disks are generated automatically on separate datastores, and
- wherein the instructions causing the machine to apply changes from first differential disk to a copy of data on a backup storage comprises instructions causing the machine to:
- read a list of changes from a delta marker stream;
- for each change, read data from production virtual machine disk; and
- write the data read to the backup storage.

* * * * *